(12) United States Patent
Zebrowski

(10) Patent No.: US 8,499,542 B2
(45) Date of Patent: Aug. 6, 2013

(54) FLOW BALANCING VALVE

(75) Inventor: Thaddeus J. Zebrowski, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 54 days.

(21) Appl. No.: 13/211,682

(22) Filed: Aug. 17, 2011

(65) Prior Publication Data

US 2013/0042622 A1    Feb. 21, 2013

(51) Int. Cl.
*F02C 9/00* (2006.01)
*F02C 1/00* (2006.01)
*G05D 11/02* (2006.01)

(52) U.S. Cl.
USPC ............... 60/39.281; 60/737; 60/746; 60/747; 137/98

(58) Field of Classification Search
USPC ............... 60/39.281, 737, 746, 747; 137/98
See application file for complete search history.

(56) References Cited

U.S. PATENT DOCUMENTS

| | | | | |
|---|---|---|---|---|
| 2,972,338 A * | 2/1961 | Lloyd | | 91/385 |
| 3,095,906 A * | 7/1963 | Kolm, Jr. | | 137/625.62 |
| 3,555,969 A * | 1/1971 | Shah | | 91/461 |
| 3,566,919 A * | 3/1971 | Vanderlaan | | 137/625.63 |
| 3,943,957 A * | 3/1976 | Hayner | | 137/85 |
| 3,946,551 A * | 3/1976 | Linebrink et al. | | 60/39.281 |
| 4,067,357 A * | 1/1978 | Ruchser | | 137/596.16 |
| 4,137,944 A * | 2/1979 | Koch | | 137/596 |
| 4,282,900 A * | 8/1981 | Lauba et al. | | 137/625.3 |
| 4,614,202 A * | 9/1986 | Halvorsen et al. | | 137/118.02 |
| 5,027,858 A * | 7/1991 | Gold | | 137/625.62 |
| 5,195,560 A * | 3/1993 | Achmad | | 137/826 |
| 5,257,502 A * | 11/1993 | Napoli | | 60/739 |
| 5,284,220 A * | 2/1994 | Shimizu et al. | | 180/441 |
| 5,402,634 A * | 4/1995 | Marshall | | 60/776 |
| 5,628,184 A * | 5/1997 | Santos | | 60/39.281 |
| 5,711,145 A * | 1/1998 | Perkey | | 60/39.281 |
| 6,138,705 A * | 10/2000 | Chen | | 137/98 |
| 6,269,733 B1 * | 8/2001 | Reust | | 91/415 |
| 6,422,021 B1 * | 7/2002 | Futa et al. | | 60/739 |
| 6,583,525 B2 * | 6/2003 | Dyer et al. | | 310/53 |
| 6,601,602 B2 * | 8/2003 | Adler et al. | | 137/115.23 |
| 6,637,184 B2 | 10/2003 | Freeman | | |
| 6,655,152 B2 | 12/2003 | Griffiths et al. | | |
| 7,137,613 B2 | 11/2006 | Jansen | | |
| 7,216,487 B2 | 5/2007 | Parsons | | |

(Continued)

OTHER PUBLICATIONS

James E. May, "Active Pattern Factor Control for Gas Turbine Engines," from http://www.grc.nasa.gov/WWW/RT/RT1997/5000/553may.htm, visited on Feb. 9, 2011, 3 pages.

*Primary Examiner* — Phutthiwat Wongwian
*Assistant Examiner* — Michael B Mantyla
(74) *Attorney, Agent, or Firm* — Kinney & Lange, P.A.

(57) ABSTRACT

A flow balancing valve for a multistage combustor includes a first pressure feedback line, a first burn line, and a first metering port fluidly connected to the first fuel injector. The flow balancing valve further includes a second pressure feedback line, a second burn line, and a second metering port fluidly connected to the second fuel injector. A metering land is located between and defines sizes of the first metering port and the second metering port. An increase in pressure differential between the first pressure feedback line and the second pressure feedback line causes a compensatory movement in the metering land to balance fuel flow for the first fuel injector and the second fuel injector.

18 Claims, 3 Drawing Sheets

U.S. PATENT DOCUMENTS

| | | | |
|---|---|---|---|
| 7,325,885 B2 * | 2/2008 | Berger et al. | 303/117.1 |
| 7,472,540 B2 | 1/2009 | Berenbrink et al. | |
| 7,520,260 B2 | 4/2009 | Nakamura et al. | |
| 7,654,092 B2 | 2/2010 | Ryan et al. | |
| 7,757,662 B2 * | 7/2010 | Cooke | 123/447 |
| 7,779,863 B2 * | 8/2010 | Jacobsen et al. | 137/596.15 |
| 7,845,177 B2 | 12/2010 | Parsons | |
| 2003/0046937 A1 * | 3/2003 | Mahoney et al. | 60/773 |
| 2003/0131882 A1 * | 7/2003 | Kolze | 137/98 |
| 2008/0028742 A1 * | 2/2008 | Parsons | 60/39.281 |

\* cited by examiner

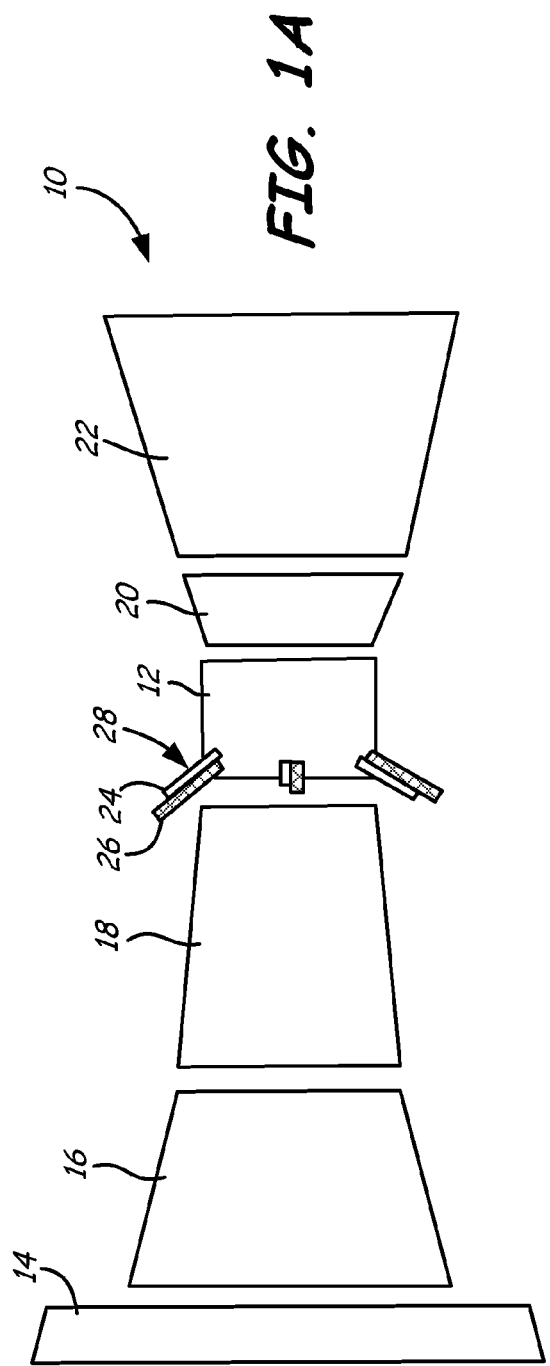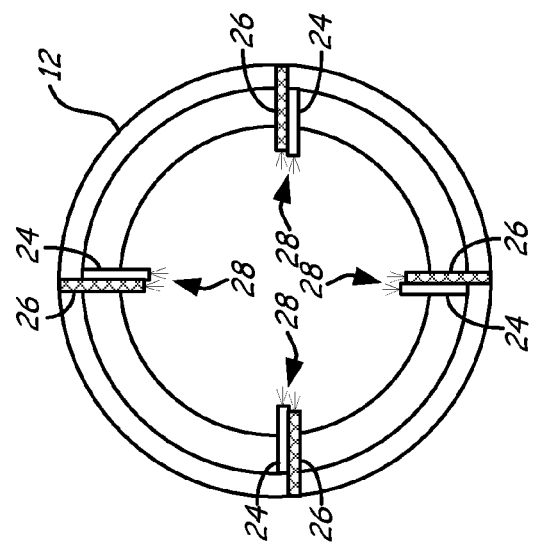

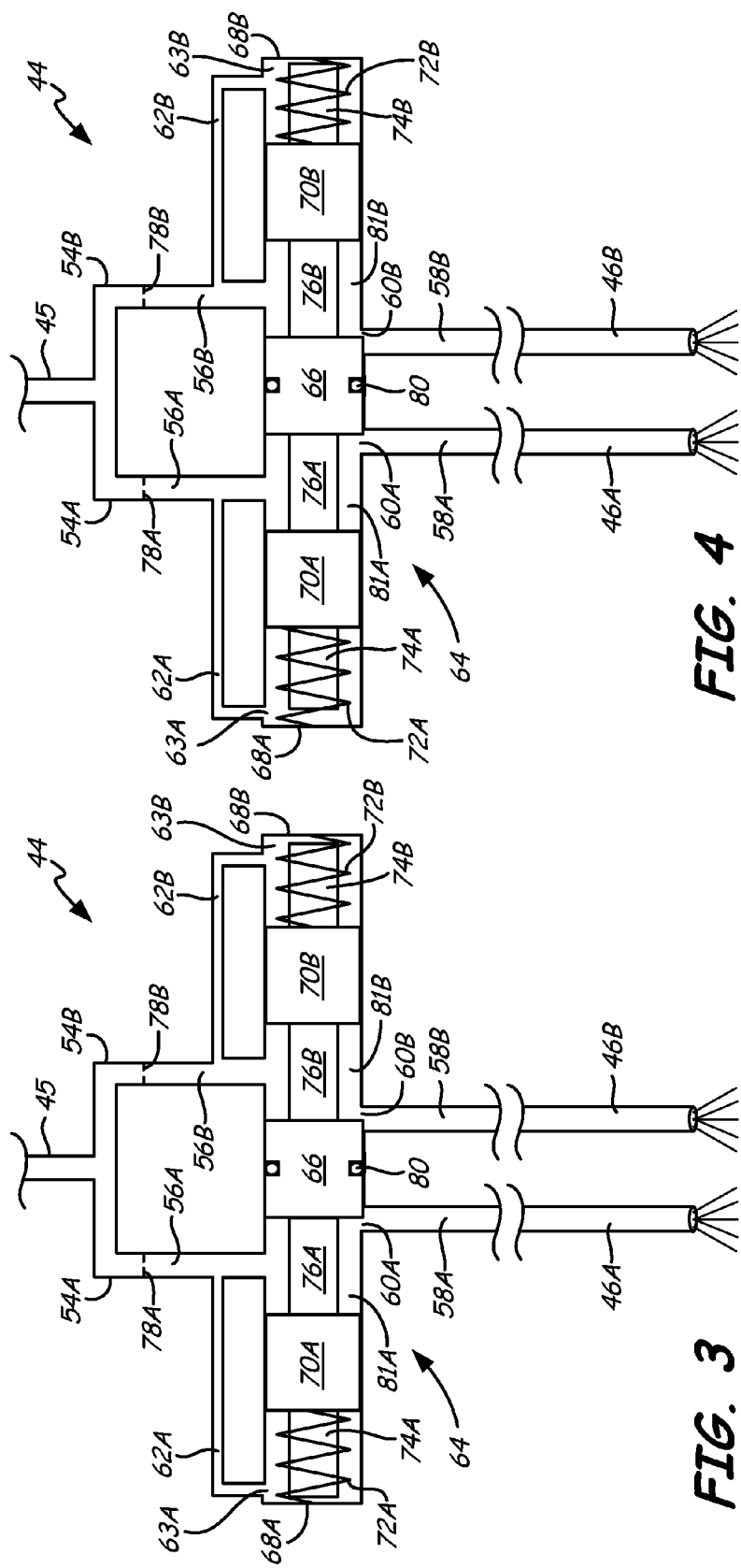

FLOW BALANCING VALVE

BACKGROUND

The present disclosure relates generally to a fuel system, and more particularly to a valve for the fuel system.

In a multistage combustor engine, fuel injectors are arranged into operative groups called "stages". Typically, a single engine-driven pump and metering valve feed fuel to a plurality of fuel distribution lines. Each fuel distribution line includes a staging valve for modulating fuel flow to a single combustor stage, which includes a plurality of fuel injectors. Some fuel systems additionally include temperature sensors proximate the fuel injectors to monitor temperature distribution around the combustor.

SUMMARY

A fuel system for a gas turbine engine includes a fuel supply, a multistage combustor, a first stage fuel metering module, and a flow balancing valve. The multistage combustor has fuel injectors organized operatively in stages including a first stage having a first fuel injector and a second fuel injector. The first stage fuel metering module fluidly connects the fuel supply to the first and second fuel injectors. The flow balancing valve fluidly connects the first stage fuel metering module and the first and second fuel injectors. The flow balancing valve includes a first pressure feedback line, a first burn line, and a first metering port fluidly connected to the first fuel injector. The flow balancing valve further includes a second pressure feedback line, a second burn line, and a second metering port fluidly connected to the second fuel injector. A metering land is located between, and defines sizes of, the first metering port and the second metering port. An increase in pressure differential between the first pressure feedback line and the second pressure feedback line causes a compensatory movement in the metering land to balance fuel flow for the first fuel injector and the second fuel injector.

A flow balancing valve for a multistage combustor includes a first burn line that fluidly connects a first input line to a first fuel injector, and a second burn line that fluidly connects a second input line to a second fuel injector. A first pressure feedback line is fluidly connected with the first burn line, and a second pressure feedback line is fluidly connected with the second burn line. A first annulus is fluidly connected with the first pressure feedback line, and a second annulus is fluidly connected with the second pressure feedback line. A first land is fluidly connected to the first annulus and a second land is fluidly connected to the second annulus. A first metering port located in the first burn line, and second metering port located in the second burn line. A metering land is attached between the first land and the second land. The metering land defines sizes of the first metering port and the second metering port. An increase of pressure in the first pressure feedback line with respect to pressure in the second feedback line causes the first land to move the metering land away from the first metering port, thereby increasing the size of the first metering port and decreasing the size of the second metering port.

BRIEF DESCRIPTION OF THE DRAWINGS

FIG. 1A is a schematic side view of a turbofan gas turbine engine having a multistage combustor.

FIG. 1B is a schematic cross section of the multistage combustor from FIG. 1A.

FIG. 3 is a schematic cross section of a flow balancing valve from the fuel distribution system of FIG. 2.

FIG. 4 is a schematic cross section of the flow balancing valve from FIG. 3 where the left fuel injector is clogged.

DETAILED DESCRIPTION

Figure 2:
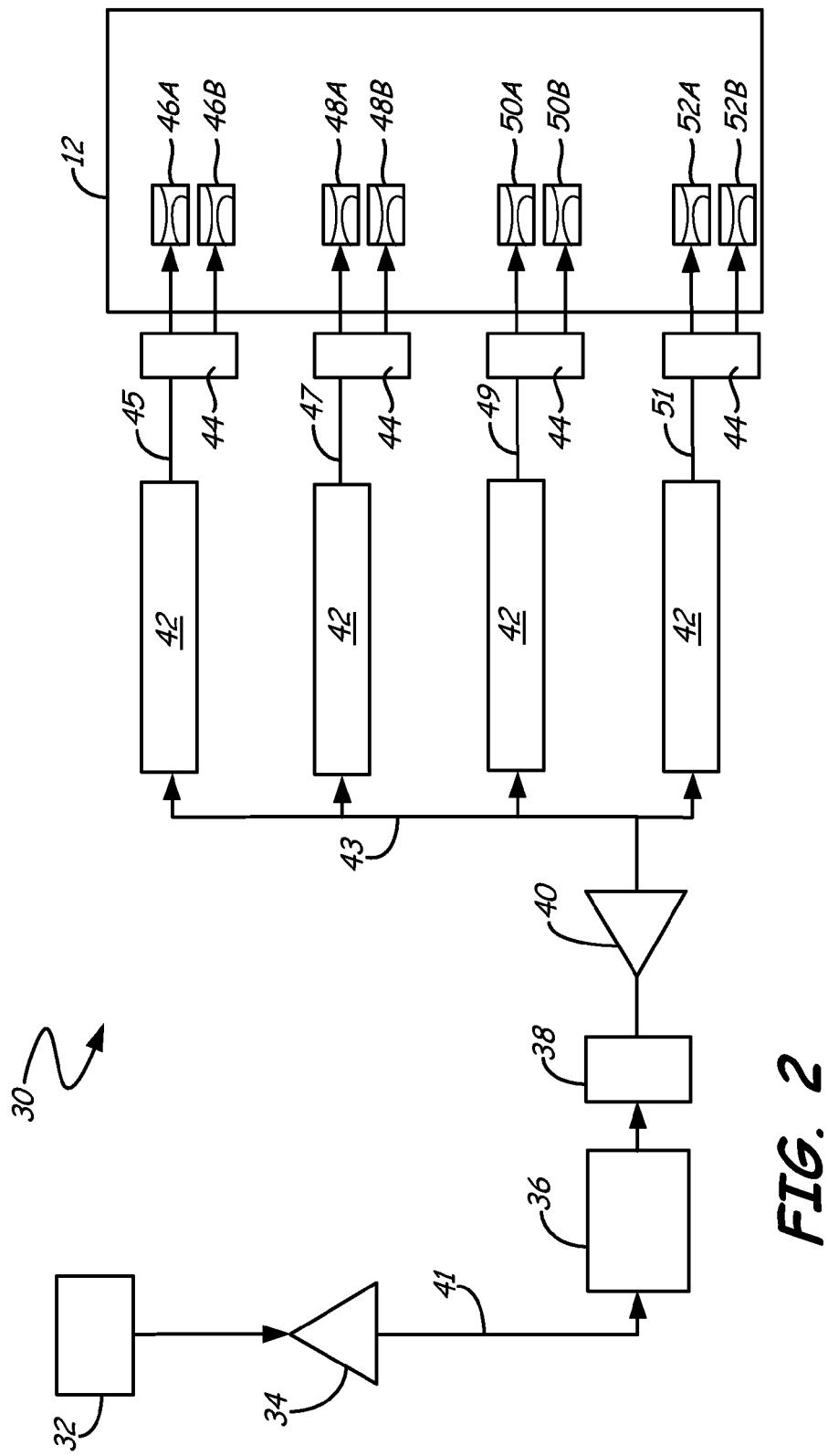
FIG. 2 is a block diagram showing a fuel distribution system for combustor of FIGS. 1A and 1B.

FIG. 1A is a side schematic view of gas turbine engine 10 having multistage combustor 12, and FIG. 1B is a cross section of multistage combustor 12. Gas turbine engine 10 includes fan 14, low pressure compressor (LPC) 16, high pressure compressor (HPC) 18, high pressure turbine (HPT) 20, and low pressure turbine (LPT) 22. Multistage combustor 12 includes first stage fuel injectors 24 and second stage fuel injectors 26 located within fuel nozzles 28. In the depicted embodiment, gas turbine engine 10 is a turbofan engine for powering an aircraft, although the invention is not so limited and can be utilized in any gas turbine engine.

Located within gas turbine engine 10 and arranged in flow series are fan 14, LPC 16, HPC 18, multistage combustor 12, HPT 20, and LPT 22. LPC 16 is mechanically coupled to LPT 22 by a low pressure shaft and HPC 18 is mechanically coupled to HPT 20 by a high pressure shaft. In operation, air enters a front end of gas turbine engine 10 at fan 14 and is compressed by LPC 16 and HPC 18. The compressed air then enters multistage combustor 12, where it is mixed with fuel and combusted. Combusted air enters HPT 20 and LPT 22 where it is expanded and forces one or both of the turbines to rotate, which drives fan 14, LPC 16 and HPC 18.

First stage fuel injectors 24 may be physically coupled with second stage fuel injectors 26, such that one first stage fuel injector 24 and one second stage fuel injector 26 form a single fuel nozzle 28. A number of fuel nozzles 28 are located around multistage combustor 12. As shown in the cross section of FIG. 1B, the depicted embodiment includes four first stage fuel injectors 24 and four second stage fuel injectors 26 coupled together to form four fuel nozzles 28. More than two fuel injector stages are possible, as are more or less fuel nozzles 28. First stage fuel injectors 24 spray fuel into multistage combustor 12 either jointly as a first stage operative group, or independently as individual injectors. Similarly, second stage fuel injectors 26 spray fuel into multistage combustor 12 either jointly as a second stage operative group or independently as individual injectors. Fuel flow and control is discussed further below with respect to FIGS. 2-4.

FIG. 2 is a block diagram showing a fuel distribution system 30 for multistage combustor 12. Fuel distribution system 30 includes tank 32, first boost pump 34, fuel/oil heat exchanger (FOHE) 36, filter 38, second boost pump 40, main conduit 41, fuel flow metering modules (FFMMs) 42, branch conduit 43, flow balancing valves 44, first stage conduit 45, first stage fuel injectors 46A and 46B, second stage conduit 47, second stage fuel injectors 48A and 48B, third stage conduit 49, third stage fuel injectors 50A and 50B, fourth stage conduit 51, and fourth stage fuel injectors 52A and 52B. Fuel distribution system 30 includes flow balancing valve 44 located between FFMM 42 and each stage of fuel injectors (46, 48, 50, 52) to balance fuel flow for each stage of multistage combustor 12.

Fuel tank (or fuel supply) 32, first boost pump 34, FOHE 36, filter 38, and second boost pump 40 are positioned in flow series along main conduit 41. Fuel, such as jet fuel, is stored in tank 32 for use by a gas turbine engine, such turbofan engine 10 aboard an aircraft. First boost pump 34 is located downstream of fuel tank 32 on main conduit 41 and pulls fuel from tank 32 along main conduit 41. In the depicted embodiment, first boost pump 34 is a gearbox driven boost pump that receives rotational input from the gas turbine engine 10. In an alternative embodiment, first boost pump 34 is electrical. FOHE 36 is located downstream of first boost pump 34 on main conduit 41. Within FOHE 36, heat from the engine oil system is commonly rejected to the fuel passing through FOHE 36. Filter 38 is located downstream of FOHE 36 on main conduit 41. Fuel flows through filter 38, which traps particulate matter to clean the fuel. Second boost pump 40 is an optional, additional pump for fuel system 30 located downstream of filter 38 on main conduit 41. A fuel pressure sensor is optionally located downstream of second boost pump 40, on main conduit 41 to sense fuel pressure before fuel flows into the branch conduits.

Just downstream of filter 38 and second boost pump 40, main conduit 41 becomes branch conduit 43, which splits fuel flow into four branch conduits corresponding to the four stages of multistage combustor 12: first stage conduit 45, second stage conduit 47, third stage conduit 49, and fourth stage conduit 51. It should be appreciated that more or less stages, as well as more or less fuel injectors per stage, are possible. Each branch conduit 45, 47, 49, 51 includes its own FFMM 42 and flow balancing valve 44 located between branch conduit 43 and fuel injectors 46, 48, 50, 52 in multistage combustor 12. A first portion of fuel flows through first FFMM 42 and first flow balancing valve 44 located on first stage conduit 45 to supply first stage fuel injectors 46A and 46B. A second portion of fuel flows through second FFMM 42 and second flow balancing valve 44 located on second stage conduit 47 to supply second stage fuel injectors 48A and 48B. A third portion of fuel flows through third FFMM 42 and third flow balancing valve 44 located on third stage conduit 49 to supply third stage fuel injectors 50A and 50B. A fourth portion of fuel flows through fourth FFMM 42 and fourth flow balancing valve 44 located on fourth stage conduit 51 to supply fourth stage fuel injectors 52A and 52B.

Each FFMM 42 has an input for electric power, and both an input and an output for central control (not shown). Each FFMM 42 exchanges information with central control to independently modulate fuel flow to a plurality of fuel injectors operatively forming a single stage of the multistage combustor. Each FFMM 42 may include one or more of a pump, a flow meter, a sensor, a controller, and a motor. The structure and function of FFMM 42 is described in detail within commonly assigned co-pending U.S. patent application Ser. No. 13/090,412, which is hereby incorporated by reference. Fuel exiting a given FFMM 42 flows into flow balancing valve 44 before flowing to fuel injectors 46, 48, 50, 52 for a given stage. The inclusion of flow balancing valves 44 in fuel distribution system 30 can reduce the number of FFMMs 42 needed, thereby reducing complexity and weight. For example, a system previously requiring two FFMMs 42 per stage can be reduced to a single FFMM 42 by inclusion of flow balancing valve 44. Flow balancing valve 44 is described in detail below with respect to FIGS. 3 and 4.

FIG. 3 is a schematic cross section of flow balancing valve 44 from fuel distribution system 30 of FIG. 2. FIG. 4 is also a schematic cross section of flow balancing valve 44, but depicts a situation where first fuel injector 46A is clogged. Depicted in FIGS. 3 and 4 are flow balancing valve 44, first stage conduit 45, and first stage fuel injectors 46 (first fuel injector 46A and second fuel injector 46B). Flow balancing valve 44 includes: input lines 54 (first input line 54A and second input line 54B), burn lines (first burn line 56A and second burn line 56B), output lines 58 (first output line 58A and second output line 58B), metering ports 60 (first metering port 60A and second metering port 60B), pressure feedback lines 62 (first pressure feedback line 62A and second pressure feedback line 62B), annuli 63 (first annulus 63A and second annulus 63B), spool 64, metering land 66, walls 68 (first wall 68A and second wall 68B), lands 70 (first land 70A and second land 70B), springs 72 (first spring 72A and second spring 72B), position limiters 74 (first position limiter 74A and second position limiter 74B), grooves 76 (first groove 76A and second groove 76B), orifices 78 (first orifice 78A and second orifice 78B), O-ring seal 80, and annuli 81 (third annulus 81A and fourth annulus 81B). Flow balancing valve 44 responds to a pressure differential between fuel flowing to first fuel injector 46A and second fuel injector 46B, and compensates for the difference in pressure to provide uniform fuel injection across first stage of multistage combustor 12.

Fuel enters flow balancing valve 44 through first stage conduit 45, which fluidly connects a fuel supply (such as fuel tank 32 shown in FIG. 2) with first and second fuel injectors 46A and 46B. Flow balancing valve 44 has bilateral symmetry about a central vertical axis. Structures that are identical on the two sides of flow balancing valve 44 share common reference numerals and are distinguished by the addition of the letter "A" or "B". In the depicted embodiment, structures on the left side of flow balancing valve 44 are designated by the letter "A", and are associated with first fuel injector 46A. Similarly, structures on the right side of flow balancing valve 44 are designated by the letter "B", and are associated with second fuel injector 46B. As discussed above with reference to FIG. 3, first fuel injector 46A and second fuel injector 46B are operatively associated with one another in the first stage of combustor 12. First fuel injector 46A and second fuel injector 46B, however, need not be located physically adjacent one another.

First stage conduit 45 splits into first input line 54A and second input line 54B. A majority of fuel flowing through first input line 54A enters first burn line 56A and continues to first output line 58A to provide a flow of fuel to first injector 46A. Similarly, a majority of fuel flowing through second input line 54B enters second burn line 56B and continues to second output line 58B to provide a flow of fuel to second injector 46B. Located between first burn line 56A and first output line 58A is first metering port 60A. Similarly, located between second burn line 56B and second output line 58B is second metering port 60B. In other words, fuel flowing through burn lines 56 will encounter metering ports 60 before exiting flow balancing valve 44.

Some of fuel flowing through first fuel input line 54A fills first feedback line 62A, and some of the fuel flowing through second input line 54B fills second feedback line 62B. First feedback line 62A has a first end fluidly connected to first burn line 56A and a second end fluidly connected to first annulus 63A. Similarly, second feedback line 62B has a first end fluidly connected to second burn line 56B and a second end fluidly connected to second annulus 63B. Spool 64 is located between burn lines 56, feedback lines 62, and output lines 58. Fuel pressures within fuel feedback lines 62 determine the positioning of metering land 66.

Spool 64 includes metering land 66, lands 70, springs 72, position limiters 74, and grooves 76. Metering land 66 is located centrally between and attaches first land 70A to second land 70B through grooves 76A and 76B. Position limiter 74 is similar to groove 76, but also limits the stroke of flow balancing valve 44. First sides of lands 70 are spaced from walls 68 by both springs 72 and position limiters 74. Second sides of lands 70 are attached to metering land 66 by grooves 76. More specifically, first side of first land 70A is attached to both first spring 72A and first position limiter 74A. The opposite side of first spring 72A is attached to first wall 68A, and the opposite side of first position limiter 74A is spaced from first wall 68A. In the depicted embodiment, spring 72A is coiled and surrounds cylindrical position limiter 74A, although the disclosure is not so limited. Second side of first land 70A is attached to metering land 66 (and therefore second land 70B) by first groove 76A. Second land 70B is attached to second spring 72B and second position limiter 74B and spaced by second wall 68B in the same configuration as described above for first land 70A. The volume around position limiters 74 are annuli 63 and the volume around grooves 76 are annuli 81. Each of the annuli (63A, 63B, 81A, 81B) is filled with fuel. Fuel pressure in feedback lines 62 flow into annuli 63 and exert pressure on lands 70 to balance metering land 66.

Located between first input line 54A and first burn line 56A, upstream of first feedback line 62A, is first orifice 78A. Similarly, located between second input line 54B and second burn line 56B, upstream of second feedback line 62B, is second orifice 78B. Orifices 78 are areas of restricted flow that reduce fuel backflow and create a pressure drop within annuli 63 as a function of fuel injector 46 pressure. O-ring seal 80 surrounds a vertical center of metering land 66 to prevent or reduce fuel from annuli 81A and 81B mixing across the bilaterally divided flow balancing valve 44. In the depicted embodiment, seal 80 sits in a groove formed around metering land 66.

In FIG. 3, fuel injectors 46 are operating normally (i.e. neither fuel injector 46 is clogged). A first fuel pressure within first feedback line 62A is approximately equal to a second fuel pressure within second feedback line 62B. The first fuel pressure in first feedback line 62A exerts a first force on first land 70A that is approximately equal to a second force exerted by second fuel pressure in second feedback line 62B on second land 70B. Since the first force on first land 70A is approximately balanced with the second force on second land 70B, metering land 66 is centered within flow balancing valve 44. In this centered position, a size of first metering port 60A is approximately equal to a size of second metering port 60B. In order words, about half of fuel flowing into flow balancing valve 44 will exit first output line 58A for first fuel injector 46A and the other half of the fuel will exit second output line 58B for second fuel injector 46B.

In FIG. 4, first fuel injector 46A is partially clogged, but second fuel injector 46B is operating normally (i.e. not clogged). Accordingly, the first fuel pressure within first feedback line 62A increases and becomes greater than the second fuel pressure within second feedback line 62B. This increased first fuel pressure pushes against first land 70A and first spring 72A begins to extend. First land 70A, first position limiter 74A, and first groove 76A all move away from first wall 68A (i.e. toward second wall 68B). The relatively less pressure within second feedback line 62B cannot match the force exerted by first feedback line 62A. Therefore, second spring 72B contracts and second land 70B, second position limiter 74B, and second groove 76B all move toward second wall 68B (i.e. away from first wall 68A). Since metering land 66 is connected between first land 70A and second land 70B, it also shifts in response to the pressure differential. Metering land 66 moves away from first wall 68A, thereby increasing the size of first metering port 60A. Simultaneously, metering land 66 is moving toward second wall 68B, thereby decreasing the size of second metering port 60B. In FIG. 4, flow balancing valve 44 is shifted such that the flow area of first metering port 60A is approximately 75%, and the flow area of second metering port 60B is the remaining approximately 25%. Therefore, flow balancing valve 44 has compensated for the clogging of first fuel injector 46A by increasing fuel flow to first fuel injector 46A and decreasing fuel flow to second injector 46B.

Flow balancing valve 44 self-corrects by adjusting fuel flow between two fuel injectors when one of the injectors is clogged. At some point, first fuel injector 46A may become so clogged that the pressure differential between the first fuel pressure in first feedback line 63A and the second fuel pressure in second feedback line 63B is quite significant. Second position limiter 74B is configured to hit second wall 68B at a time before second metering port 60B becomes completely closed (between approximately 25% and 1% of total metering land flow area). It should be appreciated that flow balancing valve 44 also works in the opposite direction (e.g. a clogging of second fuel injector 46B results in an increase of pressure in second feedback line 63B relative to first feedback line 63A and a compensatory movement of metering land 66 away from second wall 68B and toward first wall 68A). When an injector becomes clogged, it causes a non-uniform distribution of temperature around a combustor, known as "combustor pattern factor". The disclosed flow balancing valve 44 aids in controlling temperature distribution by balancing fuel flow to two fuel injectors in the same stage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for a gas turbine comprising:
  a fuel supply;
  a multistage combustor having fuel injectors organized operatively in stages including a first stage having a first fuel injector and a second fuel injector;
  a first stage fuel metering module fluidly connecting the fuel supply to the first and second fuel injectors; and
  a flow balancing valve fluidly connecting the first stage fuel metering module and the first and second fuel injectors, the flow balancing valve including:
    a first pressure feedback line fluidly connected to a first burn line, and a first metering port fluidly located in the first burn line and connected to the first fuel injector;
    a first input line connecting the first stage fuel metering module to the first burn line;
    a second pressure feedback line fluidly connected to a second burn line, and a second metering port fluidly located in the second burn line and connected to the second fuel injector;
    a second input line connecting the first stage fuel metering module to the second burn line;
    first and second annuli fluidly connected to the first and second pressure feedback lines, respectively;
    first and second lands fluidly connected to the first and second annuli, respectively; and
    a metering land attached between the first and second lands, the metering land located between and defining sizes of the first metering port and the second metering port,
  wherein an increase in pressure differential between the first pressure feedback line and the second pressure feedback line causes a compensatory movement in the metering land to balance fuel flow for the first fuel injector and the second fuel injector.

2. The fuel system of claim 1, wherein the compensatory movement in the metering land further opens the metering port associated with the pressure feedback line having a relatively higher pressure.

3. The fuel system of claim 1, wherein the compensatory movement in the metering land partially closes the metering port associated with the pressure feedback line having a relatively lower pressure.

4. The fuel system of claim 1, wherein substantially equal pressures between the first pressure feedback line and the second feedback line results in substantially equal sizes of the first metering port and the second metering port.

5. The fuel system of claim 1, wherein the metering land includes an o-ring seal.

6. The fuel system of claim 1, wherein the flow balancing valve further includes:
a first position limiter; and
a second position limiter, wherein the position limiters limit the compensatory movement of the metering land.

7. The fuel system of claim 1, wherein the flow balancing valve further includes:
a first spring; and
a second spring, wherein the springs balance the metering land between the first metering port and the second metering port.

8. The fuel system of claim 1, wherein the flow balancing valve further includes:
a first orifice; and
a second orifice, wherein the orifices create a pressure drop in the flow balancing valve.

9. The fuel system of claim 1, wherein the fuel flow metering module further comprises:
a positive displacement pump for pumping fuel;
a flow meter for measuring fuel flow;
a first pressure sensor for sensing fuel pressure;
a controller for receiving and analyzing information regarding fuel flow from the flow meter, fuel pressure from the first pressure sensor, and fuel demand from the electronic engine control; and
an electric motor for driving the positive displacement pump in accordance with a signal received from the controller to modulate fuel output for the fuel metering module.

10. The fuel system of claim 1, further comprising:
a boost pump downstream of the fuel supply;
a fuel/oil heat exchanger downstream of the boost pump; and
a filter downstream of the fuel/oil heat exchanger and upstream of the fuel flow metering module.

11. The fuel system of claim 1 and further comprising:
a first output line fluidly connected to the first metering port such that the metering land controls fluid flow from the first burn line to the first output line by adjusting a size of the first metering port; and
a second output line fluidly connected to the second metering port such that the metering land controls fluid flow from the second burn line to the second output line by adjusting a size of the second metering port.

12. A flow balancing valve for a multistage combustor, the flow balancing valve comprising:
a first burn line that fluidly connects a first input line to a first fuel injector;
a second burn line that fluidly connects a second input line to a second fuel injector;
a first pressure feedback line fluidly connected to the first burn line;
a second pressure feedback line fluidly connected to the second burn line;
a first annulus fluidly connected to the first pressure feedback line;
a second annulus fluidly connected to the second pressure feedback line;
a first land fluidly connected to the first annulus;
a second land fluidly connected to the second annulus;
a first metering port located in the first burn line;
a second metering port located in the second burn line; and
a metering land attached between the first land and the second land, the metering land defining sizes of the first metering port and the second metering port;
wherein an increase of pressure in the first pressure feedback line with respect to pressure in the second pressure feedback line causes the first land to move the metering land away from the first metering port, thereby increasing the size of the first metering port and decreasing the size of the second metering port.

13. The flow balancing valve of claim 12, further comprising:
an o-ring seal surrounding the metering land to seal a first annulus from a second annulus.

14. The flow balancing valve of claim 13, further comprising:
a first wall spaced from the first land; and
a first spring in the first annulus, the first spring having a first side attached to the first wall and a second side attached to a first side of the first land.

15. The flow balancing valve of claim 14, further comprising:
a second wall space from the second land; and
a second spring in the second annulus, the second spring having a first side attached to the second wall and a second side attached to a first side of the second land.

16. The flow balancing valve of claim 15, further comprising:
a first position limiter extending from the first side of the first land toward the first wall to prevent the metering land from completely closing the first metering port.

17. The flow balancing valve of claim 16, further comprising:
a second position limiter extending from the first side of the second land toward the second wall to prevent the metering land from completely closing the second metering port.

18. The flow balancing valve of claim 17, wherein the first burn line includes a first orifice and the second burn line includes a second orifice.

* * * * *